United States Patent [19]

Hendricks

[11] Patent Number: 4,787,726

[45] Date of Patent: Nov. 29, 1988

[54] REMOTELY CONTROLLED VEHICLE MIRROR WITH SLIP CLUTCH

[76] Inventor: Richard M. Hendricks, 4431 Beulah Cove, Claremore, Okla. 74017

[21] Appl. No.: 23,547

[22] Filed: Mar. 9, 1987

[51] Int. Cl.[4] .......................... G02B 7/18; B60R 1/06
[52] U.S. Cl. ................................... 350/637; 248/900
[58] Field of Search ............... 350/637, 632; 248/476, 248/900

[56] References Cited

U.S. PATENT DOCUMENTS

| 3,005,384 | 10/1961 | Baird et al. | 350/637 |
| 3,429,639 | 2/1969 | Peters | 350/637 |
| 3,610,736 | 10/1971 | Bateman | 350/637 |
| 4,456,333 | 6/1984 | Hewitt | 350/637 |

Primary Examiner—Jon W. Henry
Attorney, Agent, or Firm—Head & Johnson

[57] ABSTRACT

Remote controlled rearview truck-type mirror has slip clutch pre-assembled and pre-loaded as a part of a longitudinal support rod that connects the mirror housing to a support bracket attached to the truck.

7 Claims, 7 Drawing Sheets

REMOTELY CONTROLLED VEHICLE MIRROR WITH SLIP CLUTCH

BACKGROUND OF THE INVENTION

This invention is directed to the field of rearview mirrors and in particular, those that are remotely controlled from the interior of the vehicle.

In the operation of motor vehicles, and especially trucks, it is imperative that the operator must be able to view, for safety reasons, the sides of the road behind the operator's cab. As is well known, such observation is accomplished through the use of mirrors on at least one and usually both sides of the vehicle. The adjustability of the mirror on the right side of the vehicle is too distant from the driver's position to be acurately adjusted. The mirror on the left side of large trucks is, in many instaces, also too remote or conveniently accessible for adjustment, especially during highway travel.

A rearview mirror for large cargo vehicles consisting of a trailer and a tractor become especially important so that the driver can view the road directly behind the trailer not only on straight highways but also during the sharp turn manuvers or backing toward a loading platform.

Another problem with vehicular/truck mirrors is that the mirrors and/or their support frames become handholds and as such are constantly in need of readjustment by the driver. Also driving close to tree limbs will knock the mirror out of adjustment.

Typical of the prior art is found in the following U.S. Pat. Nos. 3,610,736; 3,830,561; 4,158,483; 4,256,375; 4,295,708; 4,456,333; 4,464,016 and 4,464,017. The nature of a remotely controlled mirror requires that it be remotely adjustable, that it provide mechanism to prevent damage when turned or handled other than by the remote system; and that it be vibration free.

SUMMARY OF THE INVENTION

It is a principle object of the present invention to provide a remotely controlled, electrically power driven mirror, for vehicles and, in particular, trucks that meets the requirements of such a mirror overcome the problems heretofore found with the prior art structures.

It is a further object of the invention to provide a remotely controlled vehicular mirror in which the movement of the mirror and its associated housing is relative to a longitudinal support rod affixedly attached to the vehicular mirror support brackets. A further extension of that object is to provide a remotely controlled mirror in which the primary drive mechanism is rotatable about a relatively fixed worm gear which is coaxially attached to the aforesaid longitudinal support rod with the further provision that the worm gear, being held under a designed torque to the support rod will allow relative movement of the worm gear to the support rod in the event of forced rotation of the mirror and mirror housing by forces other than the electrical power unit, and these prevent damage to the power transmission system.

Specifically, the present invention is directed to a remotely rotatable mirror and housing which is attached to a vehicle support bracket extending outward and adjacent to the operator's cab on eiher or both sides thereof. The housing is defined by the mirror making up the frontal portion of the assembly which is connected to a rear portion and a top and bottom cap creating a substantially sealed housing. A pre-assembled transmission case is positioned inside the housing upon either the top or the bottom cap. The transmission case is assembled relative to a longitudinal support rod that projects through bushings in the top and bottom caps and in the transmission case. The ends of the support rod are threaded and retained under tension to the top and bottom caps. The outward extensions of the support rod thence being attached to the vehicular support bracket.

The transmission case comprises an important aspect of the invention which is typically pre-assembled and includes an electric motor that is mounted to the case. An output shaft from the motor extends internally of the case and has a pinion gear thereon which is operably engagable with a first spur gear attached to a first driven shaft that is parallel to the longitudinal support rod. The first spur gear is positioned on the first driven shaft to be operably engaged with the motor pinion gear. In addition, a first worm is attached to the first driven shaft which is operably positioned adjacent a first worm wheeel or gear gear that is attached to a second driven shaft. The second driven shaft being transverse to the first driven shaft and having assembled thereto in addition to the first worm wheel or gear, a second worm. Adjusting the tension of the second driven shaft relative to the transmission case permits vibration control of the mirror and mirror housing without sacrificing the power output to rotate the mirror and mirror housing. A second worm wheel or gear is assembled about the support rod contiguous with the second worm. The second worm gear forms an additional important aspect of the invention by being located between a top-stop member and an adjustable bottom stop. The adjustable bottom stop member, when pre-assembled to the longitudinal support rod, is placed under a designed torque, i.e., 60–100 inch-pounds of torque depending upon the frictional contact surfaces, the surface area and the particular materials involved. In one embodiment 80 inch pounds of torque has been found to be sufficient to permit rotation of the mirror and mirror housing relative to the support rod, yet will act as a slip clutch, that is, it will rotate relative to the longitudinal support shaft in the event the mirror and housing are inadvertently rotated by forces other than from the power supply. Vibration is further controlled or dampened by adjustment of the torque or tension placed upon the longitudinal support rod.

The aforesaid objects and other objects will become readily apparent upon further review of the specification, claims and the drawings herein.

DETAILED DESCRIPTION OF THE DRAWINGS

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Figure 1:
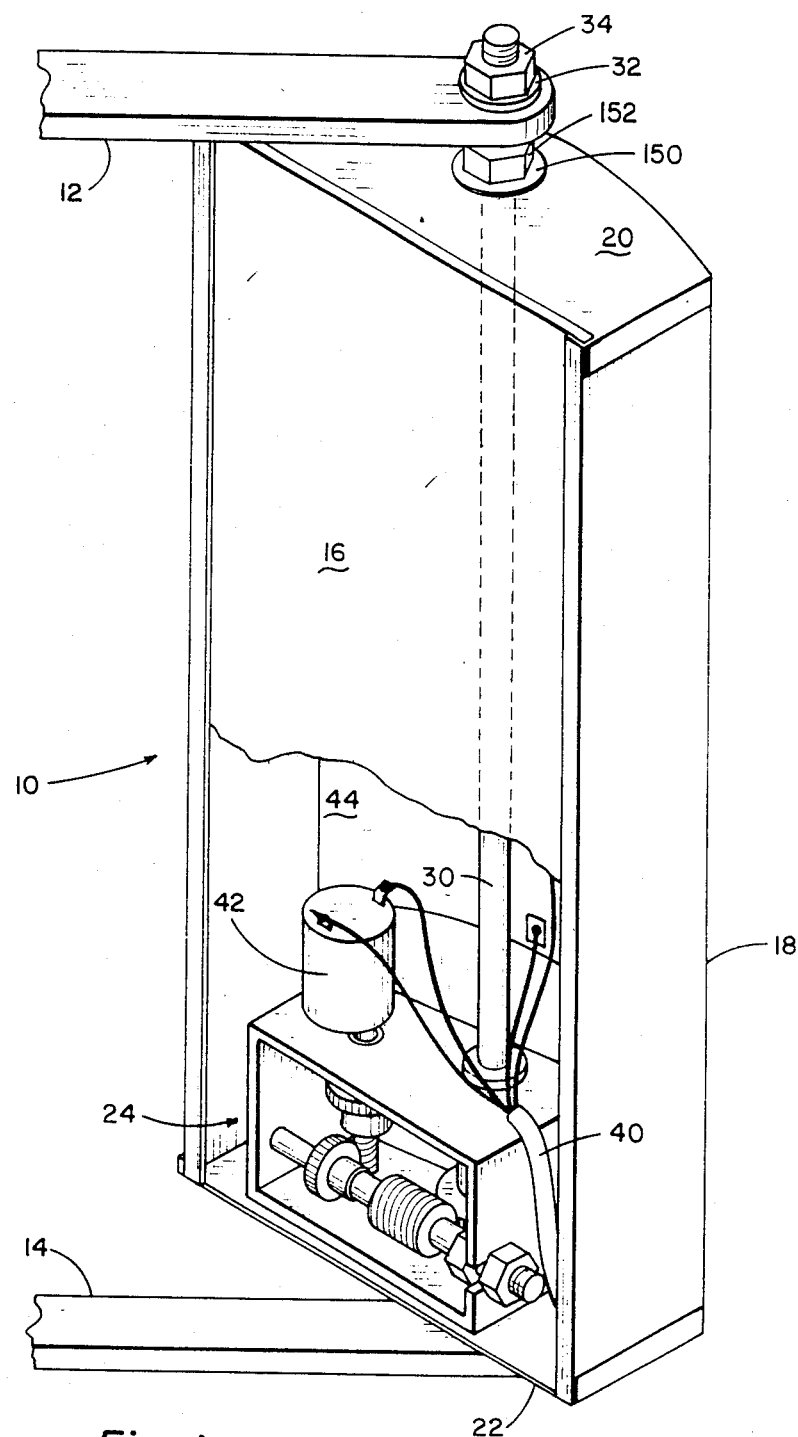
FIG. 1 is a perspective view of the apparatus of this invention, with the mirror partly cut away.
Figure 2:
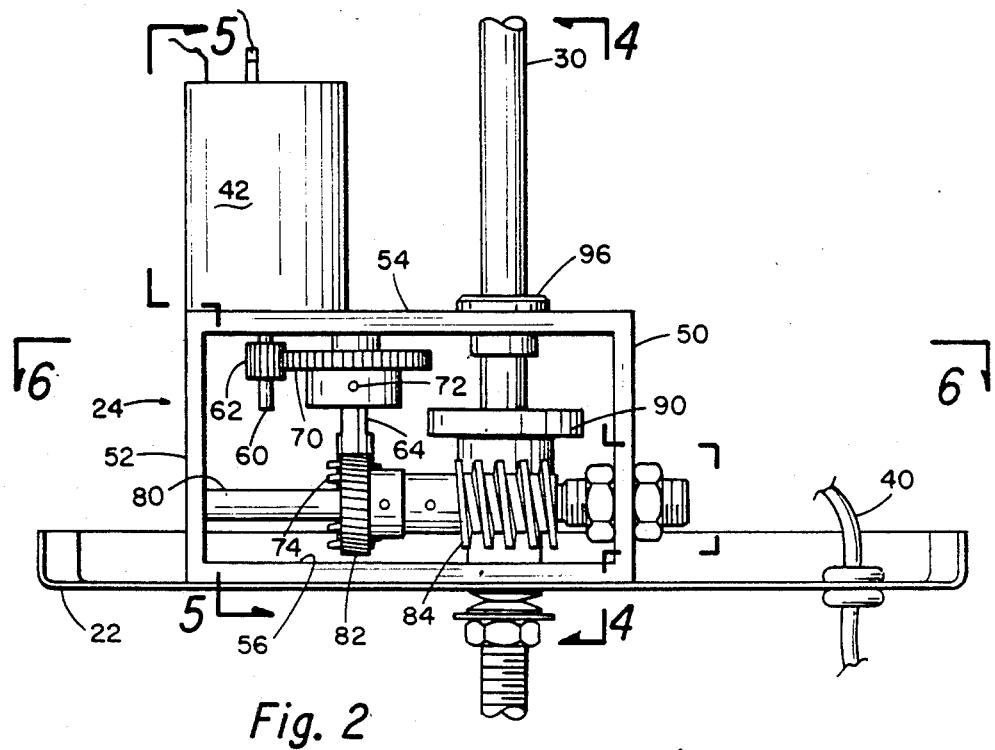
FIG. 2 is a partial front elevational view of the lower portion of the mirror housing and bottom end cap showing the transmission case and assembly of this invention.
Figure 3:
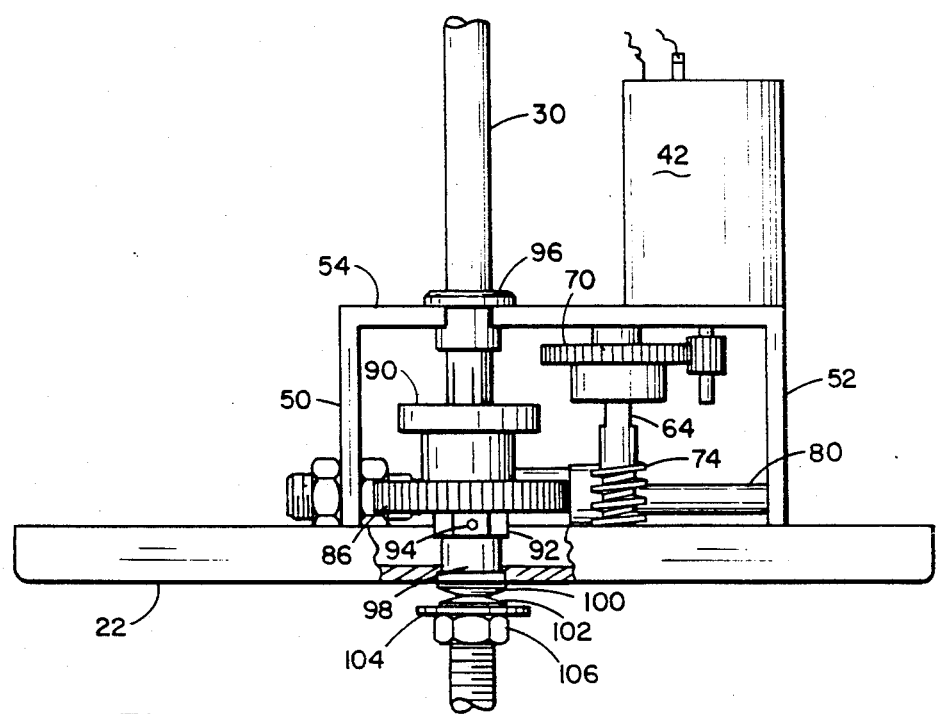
FIG. 3 is a rear elevational view of the apparatus shown in FIG. 2.
Figure 6:
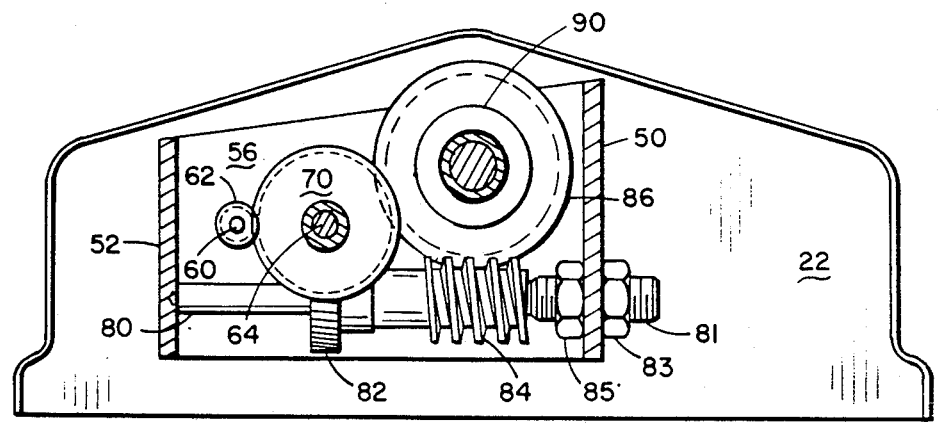
FIG. 6 is a top sectional view of the transmission assembly taken along the line 6—6 of FIG. 2.
Figure 5:
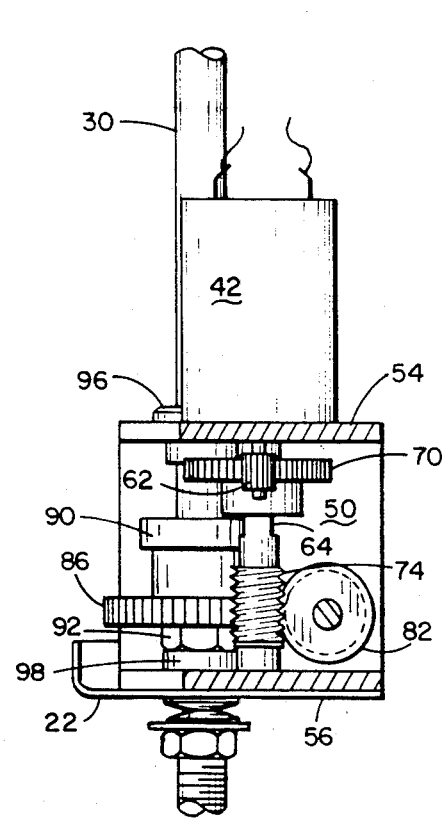
FIG. 5 is a partial sectional view taken along the line 5—5 of FIG. 2.
Figure 4:
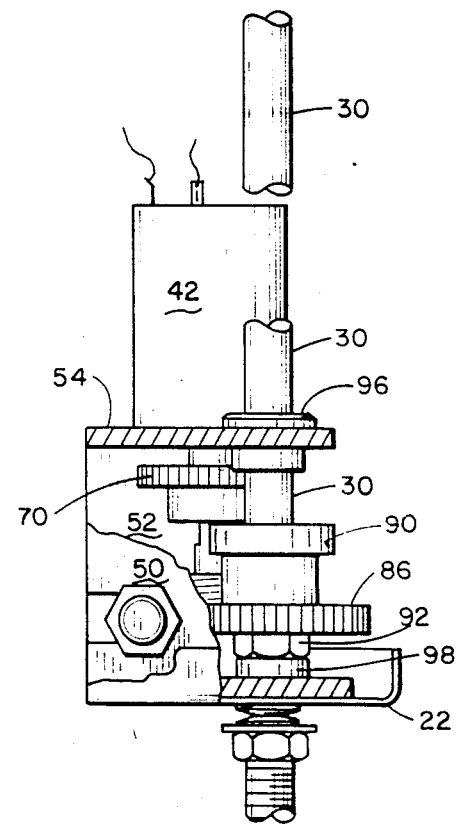
FIG. 4 is a partial sectional view of the righthand side of the transmission assembly taken along the line 4—4 of FIG. 2.

Referring now to FIG. 1, the overall assembly of the mirror and housing of this invention is generally indicated by the numeral 10 which is attachable in this instance to top support bracket 12 and a lower support bracket 14 which are attached to the vehicle, not shown. The mirror 16 comprises the front portion of the housing which is connected to a combined side and rear housing 18 being further enclosed by a top cap 20 and a bottom cap 22. A transmission case generally indicated at 24, the assembly of which is hereinafter described is positioned, in this instance, to the bottom cap 22. The transmission case is interconnected to a longitudinal support rod 30 that extends and is affixedly attached to the top and bottom brackets 12 and 14 respectively by appropriate washer 32 and threaded nut 34 which are shown for the top assembly and an identical means for attachment of the support rod to the bottom bracket 14 and best shown in the remaining Figures. An electrical power supply 40 is provided to power electric motor 42 and, in some instances, a heater element 44 positioned within the housing to keep front, ice and snow off of the mirror.

Figure 7:
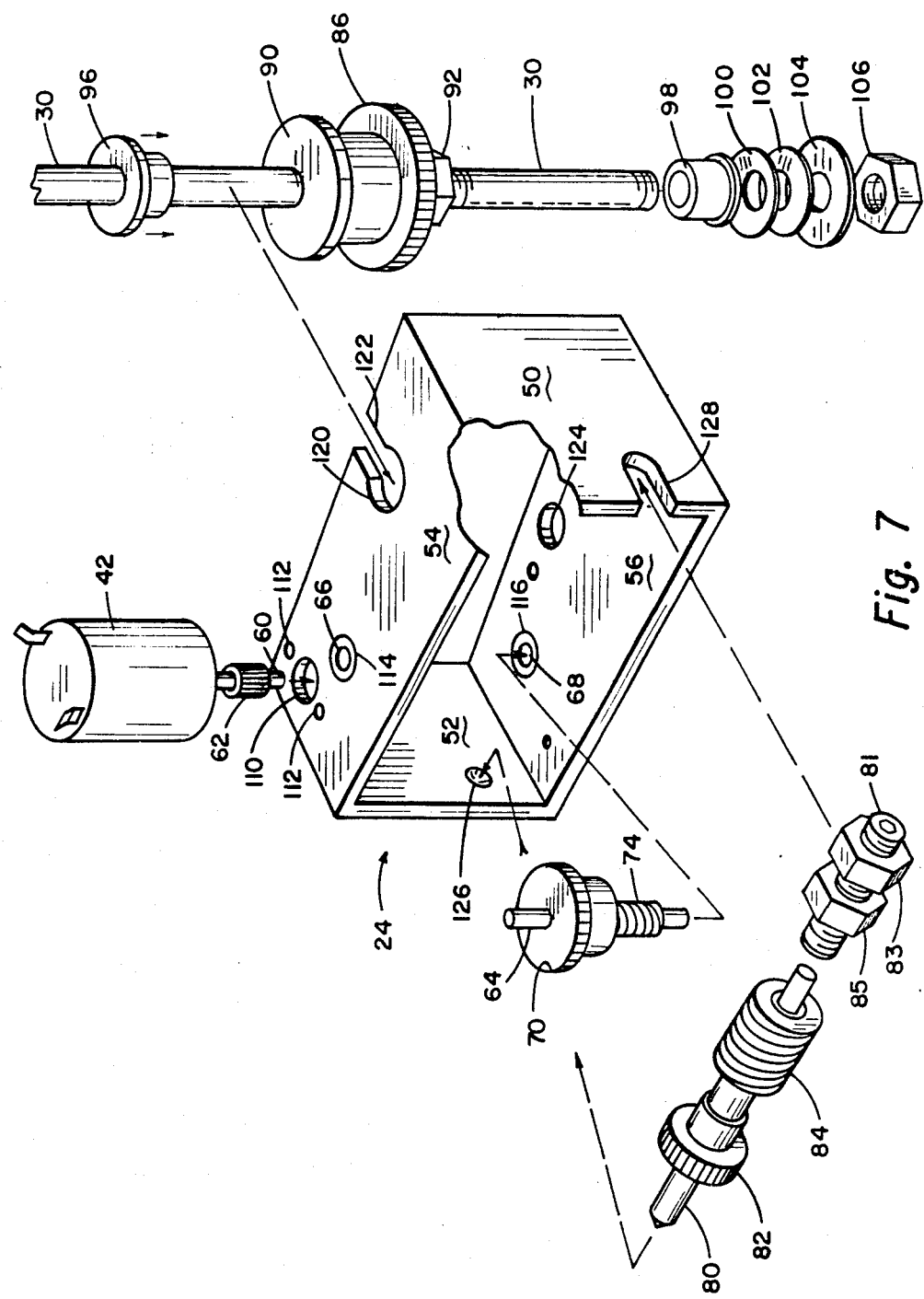
FIG. 7 is an exploded perspective view depicting the assembly of the power transmission assembly.

Referring now in greater particularity to the transmission assembly, reference is made to FIGS. 2-6. The transmission case is constructed of rigid lightweight material i.e., aluminum and comprises a rectangular enclosure opened at the front and back and comprises, when viewing from the driver's cab, a right side 50, left side 52, top 54 and bottom 56. The power supply 42 is attached to the top 54 with an opening extending therethrough to receive the output shaft 60 to which is attached an motor pinion gear 62. A first driven shaft 64 is supported to the top 54 and the bottom 56 of the transmission case by appropriate bushings 66 and 68 (See FIG. 7). Shaft 64 is positioned so as to be parallel to the electric motor output shaft 60 and the longitudinal support rod 30. Preassembled thereto is a first spur gear 70 by using a transverse pin 72. Also attached thereto is a first worm 74.

A second driven shaft 80 is attached between the right and left sides 50 and 52 of the transmission case transversely to the first driven shaft 64 and the longitudinal support rod 30. This second driven shaft has preassembled thereto a first worm gear 82 and a second worm 84. The first worm gear is in engagement with the worm 74 while the second worm 84 is positioned to be in engagement with a second worm gear 86. The second worm gear 86 is positioned about longitudinal support rod 30 so as to be relatively rotatable thereabout as a slip clutch as hereinafter described. However, in practice, the second worm gear 86 is rigidly retained to the longitudinal support shaft 30 between a top stop nut 90 and an adjustable bottom stop 92. The bottom stop nut is rotated against the second worm gear 86 until a pre-established inch-pounds of torque are applied thereto after which the nut is drilled and pinned at 94 to the longitudinal support rod 30. This clutch like assembly permits the relative rotation of the mirror and housing assembly 10 yet will slip between the top and bottom stop nuts 90 and 92. The bottom of the longitudinal support rod 30 by a plurality of belvel spring washers 100 and 102 which are positioned in opposition to each other, followed by flat washer 104 and nut 106.

An important aspect of the invention is the pre-assembled assembly and torque adjustment of the various components of the invention. The transmission case 24 is pre-prepared with an opening 110 for the power output shaft 60 and its attached pinion gear 62. Openings 112 are adapted to provide means for fixedly attaching the motor 42 to the transmission housing. Opening 114 in the top 54 of the transmission case and opening 116 in the bottom thereof are provided to receive bushings 66 and 68 for rotatable retention of the vertical output shaft 64. Opening 120 in the top 54 is connected to slot 122 in order to receive the shaft 30 and associated bushing 96. A coaxial bottom opening 124 receives the longitudinal support rod therethrough. An indentation or hole 126 is provided in the lefthand side 52 of the transmission case while opposite thereto to side 50 is a slotted opening 128.

One manner of assembly involves inserting bushing 68 into opening 116 at the bottom side 56 of transmission case 24. Thereafter, the pre-assembled first spur gear 70 and first worm 74 on shaft 64 is then positioned with the bottom end of shaft 64 into the bushing 68. Thereafter, the top bushing 66 is pressed into the top of the housing and about the top of shaft 64. The motor 42 and its pre-assembled pinion gear 62 about output shaft 60 are then mounted through the opening 110 and held by fasteners through openings 112. Pinion gear 62 is caused to engage first spur gear 70. Next a sub-assembly is made comprising the vertical support rod 30, bushing 96, sleeve nut 90, worm gear 86 and adjustment nut 92. Prior to assembly to the transmission case, appropriate torque is applied to the bottom adjustment nut 92 against the sleeve nut 90 placing the worm gear 86 in compression. Typically, torque is set at 80 inch-pounds which is found to be satisfactory to substantially rigidly retain the worm gear 86 to the longitudinal support rod 30, yet will permit slippage relative thereto upon an outside force to the mirror housing to prevent damage to the transmission mechanism and power means. The sub-assembly is then positioned in the transmission case by inserting the lower end of the longitudinal support rod 30 through opening 124, rocking the upper portion of the rod 30 through the slot 122 into the opening 120. The bushing 96 is pressed into the opening 120 while the bottom bushing 98 is then inserted into opening 124 encompassing support rod 30. This assembly is then attached to the bottom cap 22 in a well known manner e.g., blind rivits. Spring washers 100 and 102, flat washer 104 and nut 106 are attached to the lower threaded portion of support rod 30. By compressing the spring washers 100 and 102 a compressive force is applied between the adjustable bottom stop 92 and the bushing 98, sufficient to eliminate or dampen movement of the longitudinal shaft relative to the transmission housing and assembly. The assembly is placed within a support stand and the sub-assembly comprising first worm gear 82, and second worm 84 are pressed upon and positioned on shaft 80 of the worm gear 82 appropriately in engagement with first worm 74 and second worm 84 in engagement with the gear teeth of worm gear 86. The left end point of shaft 80 is inserted into the hole or indentation detent 126. Set screw 81 has positioned thereon nuts 83 and 85 spaced apart to receive the thickness of the righthand side 50 of the transmission case. One end of the set screw is positioned over the righthand end of shaft 80. using a hex wrench, appropriate compressive force is placed against shaft 80 to prevent vibration caused by slack in the various gear teeth. Once the appropriate "no-play" tension has been accomplished, the lock nuts 83 and 85 are rotated to clamp the shaft 80 into the transmission case. An adhesive as "LOC-TITE" is applied to the set screw threads to prevent loosening of the nuts 83 and 85.

Next, the housing 18 is positioned and retaining to the base plate 22. Mirror is then inserted in two vertical grooves, not shown, of the housing 18 and the top cap 20 then positioned thereabout with the longitudinal support rod extending therethrough. A top bushing, similar to bushing 98 is pressed about the support rod into the top 20 and a flat washer and nut 150 and 152 are tightened.

Figure 8:
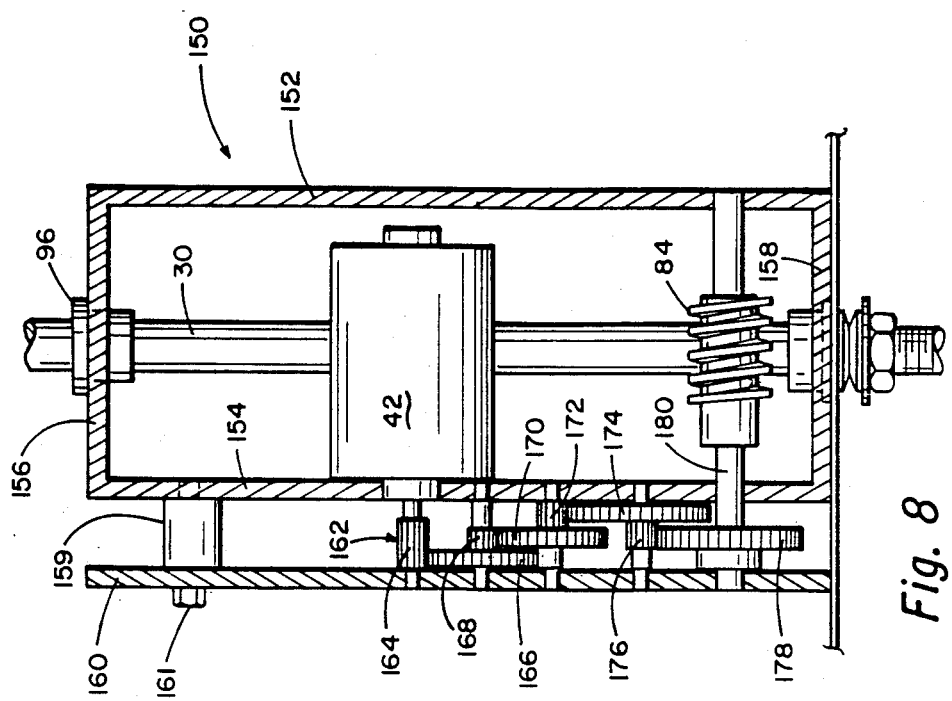
FIG. 8 is in a front cross-sectional view of an alternate embodiment of the invention.
Figure 9:
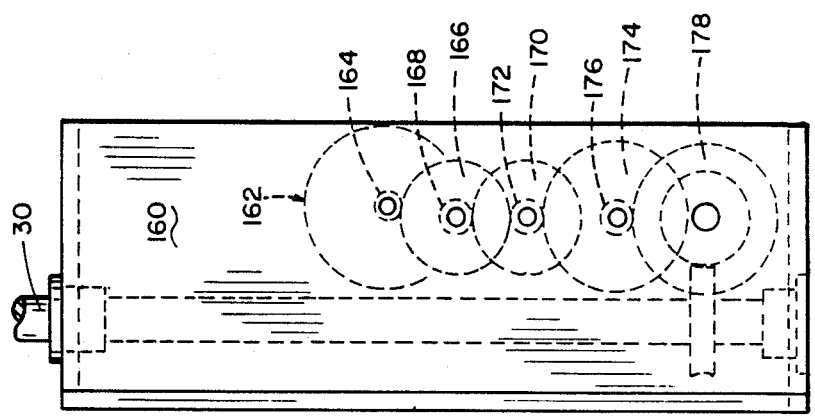
FIG. 9 is a side elevational view of the embodiment of FIG. 8.
Figure 10:
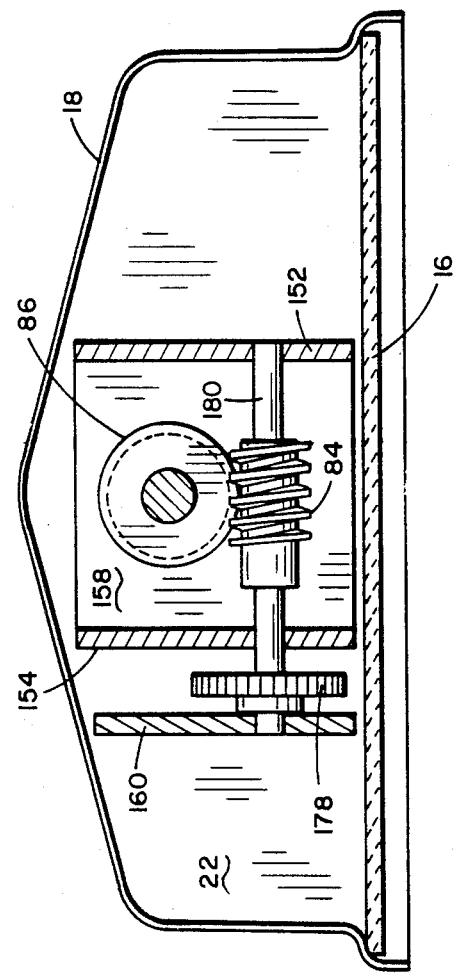
FIG. 10 is a sectional view taken along the line 10—10 of FIG. 8.

The embodiment of FIGS. 8-10 is to depict that there are other gear transmission means that are operable within the scope of this invention. Like numbers from the description of the previous embodiments is maintained. In particular there is no substantial change in the drive/slip clutch pre-assembly of the support rod 30 as shown in the previous FIGS. 1-7. Referring to FIGS. 8-10 a vertically oriented transmission, generally designated by the numeral case 150, has vertical sides 152 and 154, top 156 and bottom 158, and side 160 spaced and held by a plurality of spacers 159 and fasteners 161 from side 154 to provide support for the gear reduction train generally designated by the numeral 162. In one embodiment the gear train can be assembled as a part of a gear head motor. Electric motor 42 is attached to side 154 with its output shaft therethrough being attached to pinion gear 164. The gear train comprises alternate spur and pinion gears 166, 168, 170, 172, 176 and 178 driven by said pinion gear 164 to achieve the desired speed reduction. The gears are supported for rotation by shafts, not numbered, held by and between sides 154 and 160. Driven spur gear 178 is connected to shaft 180 which drives worm 84 to remotely operate the mirror housing and assembly as previously described.

The assembly is attached to the vehicle support brackets 12 and 14 in the appropriate manner and the appropriate electrical connections being made. In operation, once power is applied either in a right or left rotation, the movement is effectively rotating second worm 84 about the fixed worm gear 86 and longitudinal support rod 30. In the event, however, of a non-power supplied movement of the mirror and its housing, the housing will merely rotate through the slipage created between sleeve nut 90 and torque adjustment nut 92 thus preventing any damage to the transmission gear assemblies and/or transmission case.

What is claimed:

1. A remotely rotatable mirror and housing assembly for attachment to a support bracket on a vehicle, the outside of said housing assembly connected to top and bottom cap members,
 a transmission case positioned inside said housing on one of said top and bottom caps,
 a longitudinal support rod, the ends of said rod being threaded and connected to said vehicle support bracket, said rod extending through bushing located in axially aligned openings in said top and bottom caps and in said transmission case, said top and bottom caps retained to said support rod by threaded top and bottom nuts, the said nut that retains said cap where said transmission case is positioned, being used to prevent vibration of said mirror and housing assembly by connecting an assembly of a pair of opposed flat spring washers which act against said cap and the bushing of that said cap;
 said transmission case comprising;
 an electric motor mounted internally to said case,
 an output shaft from said motor,
 a motor pinion gear on said shaft,
 a first driven shaft parallel to said motor output shaft and having assembled thereto a first spur gear and a first worm, said first spur gear in engagement with said motor pinion gear;
 a second driven shaft transverse to said first driven shaft and having assembled thereto a first worm gear, and a second worm, said first worm gear in engagement with said first worm;
 a second worm gear assembled about said support rod between a top stop and bottom stop, said second worm gear in engagement with said second worm, means to adjust the torque of one of said top and bottom stops to permit controlled slippage between said support rod and said second worm gear when said mirror and housing is turned by a force other than that provided by electric motor.

2. The assembly of claim 1 including means to take up gear slack by placing said second driven shaft under compression.

3. The apparatus of claim 1 wherein said bottom stop is in compressive contact with the bushing of the cap on which the transmission case is positioned.

4. A mirror and associated housing assembly for attachment to a support bracket on a vehicle so as to be remotely rotatable about a single longitudinal support rod that is affixed its top and bottom to said support bracket comprising:
 said mirror and housing assembly having assembled and fixed thereto and internally thereof a reversible, electric power supply and power transmission means rotating a drive gear means;
 wherein said power supply, power transmission means, and drive gear means comprises
 a transmission case positioned inside said housing;
 an electric motor mounted to said case, an output shaft from said motor, a pinion gear on said output shaft;
 a first driven shaft having assembled thereto a first spur gear and a first worm, said first spur gear in engagement with said motor pinion gear;
 a second driven shaft transverse to said first driven shaft and having assembled thereto a first worm gear and a second worm, said first worm in engagement with said first worm gear and said second worm being meshed with said non-driven gear;
 and means to take up gear slack by placing said second driven shaft into compression.

5. A mirror and associated housing assembly for attachment to a support bracket on a vehicle so as to be remotely rotatable about a single longitudinal support rod that is affixed at its top and bottom to said support bracket comprising:

said mirror and housing assembly having assembled and fixed thereto and internally thereof a reversible, electric power supply and power transmission means rotating a drive gear means;

wherein said power supply, power transmission means, and drive gear means comprises;

a transmission case positioned inside said housing;

an electric motor mounted to said case, an output shaft from said motor, a pinion gear on said output shaft;

a first driven shaft having assembled thereto a first spur gear and a first worm, said first spur gear in engagement with said motor pinion gear;

a second driven shaft transverse to said first driven shaft and having assembled thereto a first worm gear and a second worm, said first worm in engagement with said first worm gear and said second worm being meshed with said non-driven gear;

wherein said power supply and said power transmission means is contained within a housing defined by said mirror at the front, a side and rear cover, and top and bottom cap members, said assembly being attached to said bottom cap, wherein the attachment of said assembly to said bottom cap includes a pair of exposed spring washers, a flat washer and a threaded nut secured around the end of said support rod that extends out of said bottom cap.

6. The assembly of claim 5 wherein the amount of torque applied to said torque adjustment means is within the range of 60 to 100 inch-pounds.

7. The assembly of claim 5 wherein said threaded nut is tightened to a place where said spring washers are substantially flat.

* * * * *